US 6,669,139 B2

(12) United States Patent
Kubica

(10) Patent No.: US 6,669,139 B2
(45) Date of Patent: Dec. 30, 2003

(54) AIRCRAFT WITH ELECTRIC FLIGHT CONTROLS PROVIDED WITH A FUSELAGE ABLE TO DEFORM AND VIBRATE

(75) Inventor: François Kubica, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/336,730

(22) Filed: Jan. 6, 2003

(65) Prior Publication Data

US 2003/0189129 A1 Oct. 9, 2003

(30) Foreign Application Priority Data

Apr. 8, 2002 (FR) ............................................ 02 04334

(51) Int. Cl.⁷ ............................................... B64C 13/16
(52) U.S. Cl. ....................... 244/76 R; 244/195; 701/14; 701/220; 73/178 R
(58) Field of Search ........................... 244/17.11, 17.13, 244/17.27, 76 R, 75 R, 76 C, 194, 195, 75 A; 702/94, 141; 701/14, 11, 12, 3–7, 220; 73/178 R

(56) References Cited

U.S. PATENT DOCUMENTS

| | | | |
|---|---|---|---|
| 3,079,108 A | | 2/1963 | Falkner et al. |
| 3,241,077 A | | 3/1966 | Smyth et al. |
| 3,279,725 A | | 10/1966 | Andrew et al. |
| 4,280,188 A | * | 7/1981 | Weinstein et al. ........ 73/178 R |
| 4,706,902 A | * | 11/1987 | Destuynder et al. ........ 244/195 |
| 5,072,893 A | * | 12/1991 | Chakravarty et al. ....... 244/194 |
| 5,224,667 A | * | 7/1993 | Lacabanne ................... 244/194 |
| 5,654,906 A | * | 8/1997 | Youngquist ................... 701/14 |
| 6,416,017 B1 | * | 7/2002 | Becker ......................... 244/194 |

* cited by examiner

Primary Examiner—Galen L. Barefoot
(74) Attorney, Agent, or Firm—Stevens, Davis, Miller & Mosher, LLP

(57) ABSTRACT

According to the invention, in this aircraft, the elements of the inertial reference system are separated according to whether they are intended for navigation (CI) or flight control (5, 6, 7). The accelerometers (5 and 6) intended for flight control are arranged at a vibration antinode, while the gyrometers (7) dedicated to flight control are placed at a vibration node. The accelerometers (5 and 6) and the gyrometers (7) are connected to the flight control computer (12) and their measurements serve as flight control parameters.

7 Claims, 3 Drawing Sheets

AIRCRAFT WITH ELECTRIC FLIGHT CONTROLS PROVIDED WITH A FUSELAGE ABLE TO DEFORM AND VIBRATE

BACKGROUND OF THE INVENTION

The present invention relates to aircraft with electric flight controls comprising a fuselage able to deform and vibrate longitudinally and laterally with the formation of vibration nodes and antinodes distributed along the longitudinal axis of said aircraft. It relates quite particularly to long-length airplanes which have high longitudinal flexibility. However, it advantageously applies equally well to airplanes of a shorter length and lower flexibility.

DESCRIPTION OF THE PRIOR ART

It is known that an aircraft with electric flight controls has flight controls such as sticks, mini sticks, rudder bars, etc., which are equipped with electric transducers so that they generate electric flight control datums representative of the action that a pilot exerts on them. It also comprises a flight control computer which, on the basis of said electric flight control datums generated by said flight controls and of flight control parameters originating, for example, from sensors, formulates electric commands that said flight control computer applies to actuators tasked with moving the control surfaces of the aircraft.

It is also known that aircraft with electric flight controls are provided with an inertial reference system (generally known as an IRS) comprising elements useful in navigation, such as the inertial unit, and elements useful in flight control, such as gyrometers and accelerometers. Finally, it is known that all these elements, whether they have to do with navigation or flight control, are grouped together in an IRS unit arranged at a given point on said aircraft. Of course, as a result, this IRS unit is subjected to the action of the deformations of the fuselage, which deformations occur mainly along the axes of pitch and yaw under the effect of the turning of the control surfaces or the effect of external disturbances.

Because of the high time constant attached to the elements useful in navigation, such deformations have only a small action thereon. By contrast, in order to get around the problems of interaction between the deformations of the fuselage and the elements useful in flight control, it is essential to have filtering means on the control surface control lines.

However, in the case of aircrafts with high longitudinal flexibility, the deformations become greater, which means that it is then necessary to perform extremely intense filtering of said control lines, and this introduces significant phase shifts thereinto and therefore detracts greatly from the performance of said control lines.

SUMMARY OF THE INVENTION

It is an object of the present invention to overcome this drawback.

To this end, according to the invention, an aircraft with electric flight controls, provided with control surfaces able to be moved by electrically operated actuators, said aircraft comprising:

controls and at least one flight control computer, said controls being actuated by a pilot and generating electric flight control datums which are sent to said flight control computer, the latter computer generating, on the basis of said electric flight control datums and flight control parameters, commands in roll, pitch and yaw, which are sent to said actuators to move said control surfaces;

an inertial reference system comprising elements useful in navigation and elements useful in flight control, the latter elements being either of the gyrometer type or the accelerometer type; and a fuselage able to deform and vibrate with the formation of vibration nodes and antinodes distributed along the longitudinal axis of said aircraft, is notable in that:

said inertial reference system has an exploded structure with said elements useful in flight control separated from said elements useful in navigation;

said elements useful in flight control are distributed along said fuselage;

each element useful in flight control, of the gyrometer type, is arranged at a vibration node of said fuselage;

each element useful in flight control, of the accelerometer type, is arranged at a vibration antinode of said fuselage; and said elements useful in flight control are connected to said flight control computer so that the measurement signals they deliver are used as flight control parameters.

Thus, said accelerometers allow the measurement of the accelerations of the aircraft including vibrational movements of the fuselage, while the gyrometers allow the measurement of the rotation rates without incorporating the structural modes of the fuselage thereinto. These accelerometer and gyrometer measurements are sent to the flight control computer which in consequence formulates commands for the control surfaces.

The flight control laws incorporated into this computer therefore do not need to filter the vibrational movements of the fuselage. This is because the structural modes measured by the accelerometers can be actively checked by the flight control laws while the gyrometers do not measure deformations of the fuselage. In the most frequent scenario, the aircraft fuselage deforms and vibrates in such a way as to have a vibration antinode at each of its ends, and a vibration node near its center of gravity.

In this case, said aircraft comprises:

at least one front accelerometer arranged at the front part of said fuselage and delivering a vertical acceleration measurement and a lateral acceleration measurement;

at least one rear accelerometer arranged at the rear part of said fuselage and delivering a vertical acceleration measurement and a lateral acceleration measurement; and at least one gyrometer arranged near said center of gravity of said aircraft and delivering roll rate, pitch rate and yaw rate measurements.

It is then advantageous for:

said vertical acceleration measurements generated by said front accelerometer and by said rear accelerometer respectively and the pitch rate measurement generated by said gyrometer, to be used as flight control parameters to formulate said pitch commands;

said lateral acceleration measurements generated by said front accelerometer and by said rear accelerometer respectively, and said roll rate and yaw rate measurements generated by said gyrometer, to be used as flight control parameters to formulate said roll commands; and said lateral acceleration measurements generated by said front accelerometer and by said rear accelerometer respectively, and said roll rate and yaw rate measurements generated by the gyrometer, to be used as flight control parameters for formulating said yaw commands.

The aircraft can then comprise:

means of filtering said acceleration measurements and the rate measurement or measurements to eliminate measurement noise therefrom and avoid spectrum folding;

gain multipliers for weighting each of said filtered acceleration or rate measurements;

phase control means for said filtered and weighted acceleration measurements; and summing means for summing said filtered, weighted and phase-controlled acceleration measurements, said filtered and weighted rate measurement or measurements and the corresponding electric flight control datum to formulate the corresponding command.

The aircraft may also, for formulating roll and yaw commands, comprise means of integrating the roll rate so as to create information about the roll angle, which information is sent to said summing means after it has been weighted by a gain multiplier.

Of course, in such an architecture, all the gains are optimized so as to satisfy the compromises between performance and stability. It is also found that the architecture according to the present invention makes it possible to dispense with low-frequency filters, even though the aircraft might be very flexible.

BRIEF DESCRIPTION OF THE DRAWINGS

The figures of the appended drawing will make it easier to understand how the invention may be embodied. In these figures, identical references denote similar elements.

DESCRIPTION OF THE PREFERRED EMBODIMENT(S)

Figure 1:
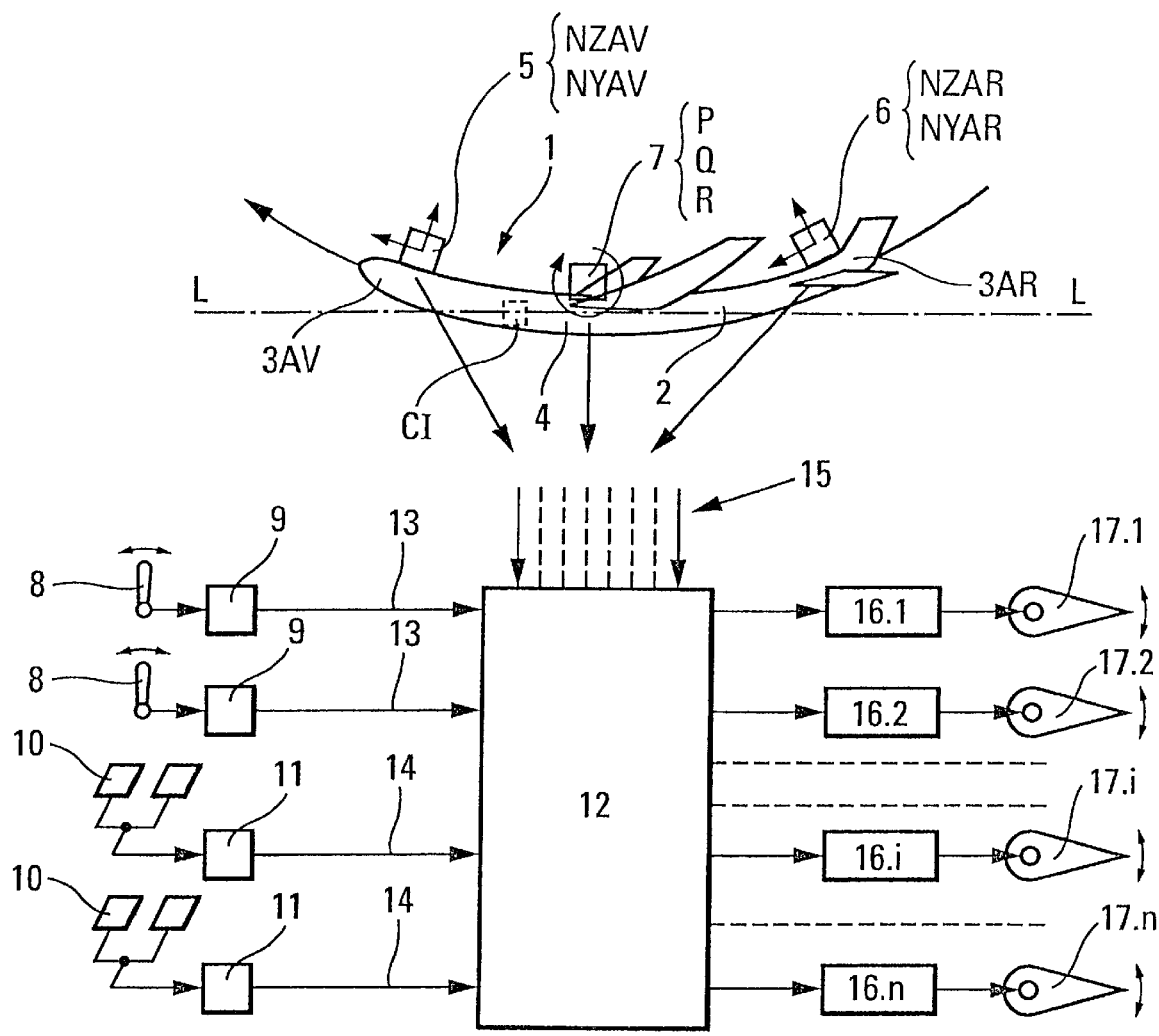
FIG. 1 schematically and generally illustrates the electric flight control system according to the present invention, the one example of an airplane with high longitudinal flexibility.

The airplane 1 with high flexibility along its longitudinal axis L—L, shown in FIG. 1, can deform under the effect of the turning of its control surfaces or of external disturbances so that the main deformation of its fuselage 2 in the yaw and pitch axes is very significant at the front 3AV and rear 3AR ends of said fuselage 2 while the center 4 of this fuselage (at which the center of gravity of the airplane 1 is located) deforms little. In addition, the rotation rates associated with the deformations of the fuselage 2 are very small near the center 4 of said fuselage.

As illustrated schematically in FIG. 1, said airplane 1 comprises:

an inertial unit CI, intended for navigation and arranged at any customary and appropriate point on said fuselage 2;

at least one front accelerometer 5 arranged at the front end 3AV;

at least one rear accelerometer 6 arranged at the rear end 3AR; and at least one gyrometer 7 near the center 4 of said airplane 1.

Figure 2:
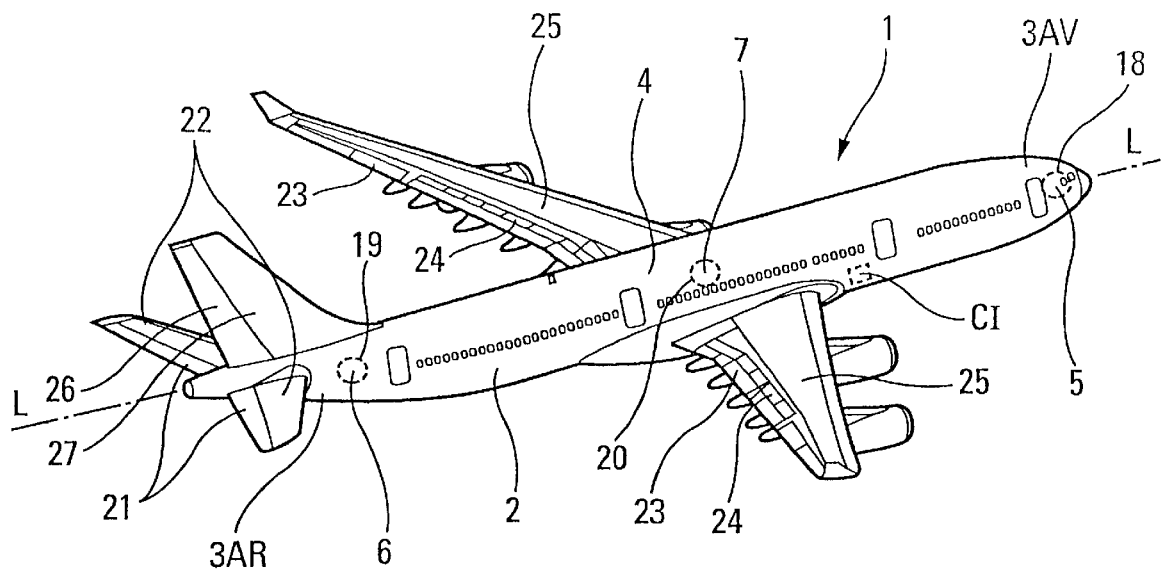
FIG. 2 shows, in schematic perspective, a civil transport airplane, with the locations of its accelerometers and gyrometers.

Of course, although in FIG. 1 the accelerometers 5 and 6 and the gyrometer 7 are depicted on the outside of the airplane 1 to make the drawings clear, they are, in actual fact, housed inside the fuselage 2 as depicted schematically in FIG. 2.

The front and rear accelerometers 5 and 6 make it possible to measure the accelerations of the airplane 1, including the vibrational movements of the fuselage 2, these accelerations being measured in the form of their lateral components (NYAV in the case of the front accelerometer 5, and NYAR in the case of the rear accelerometer 6) and vertical components (NZAV in the case of the front accelerometer 5, and NZAR in the case of the rear accelerometer 6). Moreover, the gyrometer 7 makes it possible to measure the rotation rates of the fuselage 2 near the center of gravity of the airplane 1, excluding the contribution of the structural modes thereof. These rotation rates are broken down into their three components P (roll rate), Q (pitch rate) and R (yaw rate) near the center of gravity of the airplane 1.

Moreover, said airplane 1 comprises:

at least one stick 8, for example of the mini stick type, intends to be actuated by a pilot (not depicted) and associated with a transducer 9 generating roll and pitch flight control datums representative of the movements of said stick 8;

at least one rudder bar 10 intended to be actuated by said pilot and associated with a transducer 11 generating yaw flight control datums representative of the movements of said rudder bar 10;

at least one flight control computer 12 which, in the usual way, receives:

via links 13, said roll and pitch flight control datums generated by the controls 8, 9;

via links 14, said yaw flight control datums generated by said controls 10, 11; and via links 15, flight control parameters originating from sensors, other computers, etc.

Some of said links 15 connect the accelerometers 5 and 6 and the gyrometer 7 to said flight control computer 12 so that the measurements NZAV, NZAR, NYAV, NYAR, P, Q and R form part of said flight control parameters sent to said computer 12 via the links 15.

On the basis of said roll, pitch and yaw flight control datums and of said flight control parameters, the flight control computer 12 generates commands which are sent to a number of actuators 16.1, 16.2, . . . , 16.i, . . . , 16.n each of which moves a control surface 17.1, 17.2, . . . , 17.i, . . . , 17.n accordingly.

It can be seen that the structural vibration modes measured by the accelerometers 5 and 6 can thus be actively checked by the flight control laws embedded in the computer 12, while the gyrometer 7 does not take fuselage deformation into consideration. There is therefore no need, using these flight control laws, to filter the vibrational movements of the fuselage 2.

As can be seen in FIG. 2, the accelerometers 5 and 6 are arranged respectively at locations 18 and 19 at the front end 3AV and at the rear end 3AR of the airplane 1. Furthermore, the airplane comprises:

an elevator 21, articulated to the trailing edge of an adjustable horizontal plane 22;

ailerons 23 and spoilers 24, articulated to the trailing edge of the wings 25; and a rudder 26 articulated to the trailing edge of the vertical stabilizer 27.

Of course, each of these control surfaces 21 to 24 and 26 corresponds to one of the control surfaces 17.i (where i=1 to n) in FIG. 1.

Figure 3:
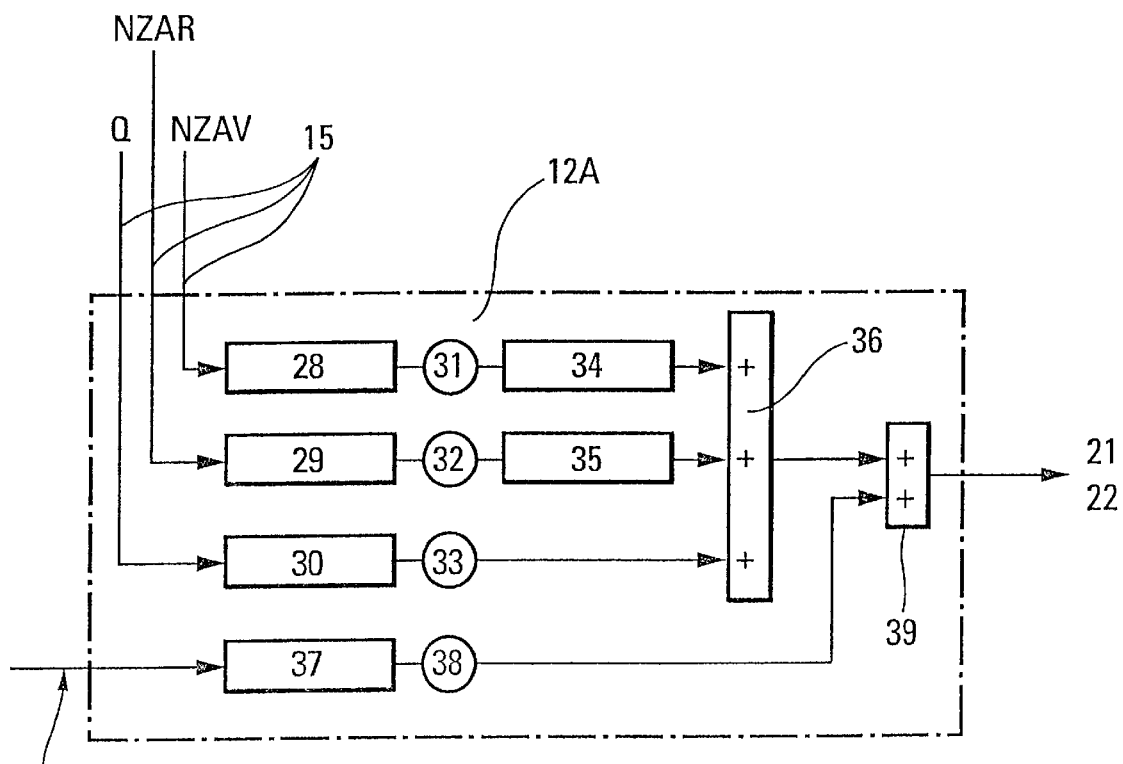
FIG. 3 is the block diagram of the pitch control system of the airplane of FIG. 2.

FIG. 3 schematically depicts the part 12A of the flight control computer 12 corresponding to pitch control in accordance with the present invention and intended to control the elevator 21 and the adjustable horizontal plane 22. This control is effected through front and rear vertical acceleration measurements NZAV and NZAR and the measurement of the pitch rate Q near the center 4, which are sent to it via the corresponding links 15.

In this part 12A of the flight control computer 12, each measurement NZAV, NZAR and Q is filtered by respective filter means 28, 29 and 30, and weighted with a gain, by gain multipliers 31, 32 and 33 respectively. Such filtering, the purpose of which is to avoid noise and spectrum folding, relates to the high frequencies in excess of 10 Hz. It is therefore not penalizing to the performance of the pitch control. In addition, phase controllers 34 and 35 receiving the weighted accelerometer measurements NZAV and NZAR are able actively to check the structural modes of the fuselage 2. Such phase control corresponds to an adjustment of the pitch control law, said adjustment being pegged to the phase of said structural modes, so as to increase their damping. The signals leaving the phase controllers 34 and 35 and the gain multiplier 33 are summed in a summer 36, making it possible at output therefrom to obtain a pitch command that is a function of the three measurements NZAV, NZAR and Q.

Furthermore, this part 12A of the computer 12 additionally comprises a processing device 37 and a gain multiplier 38 for the pitch flight control datum generated by a control 8, 9 and sent to said device 37 via a link 13.

This pitch flight control datum thus processed and weighted by the device 37 and the multiplier 38 sent to a summer 39 in which it is summed with the pitch command that appears at output from the summer 36.

The composite pitch command appearing at the output of the summer 39 is sent to the actuators 16.i of the elevator 21 and of the adjustable horizontal plane 22 to move these accordingly.

Figure 4:
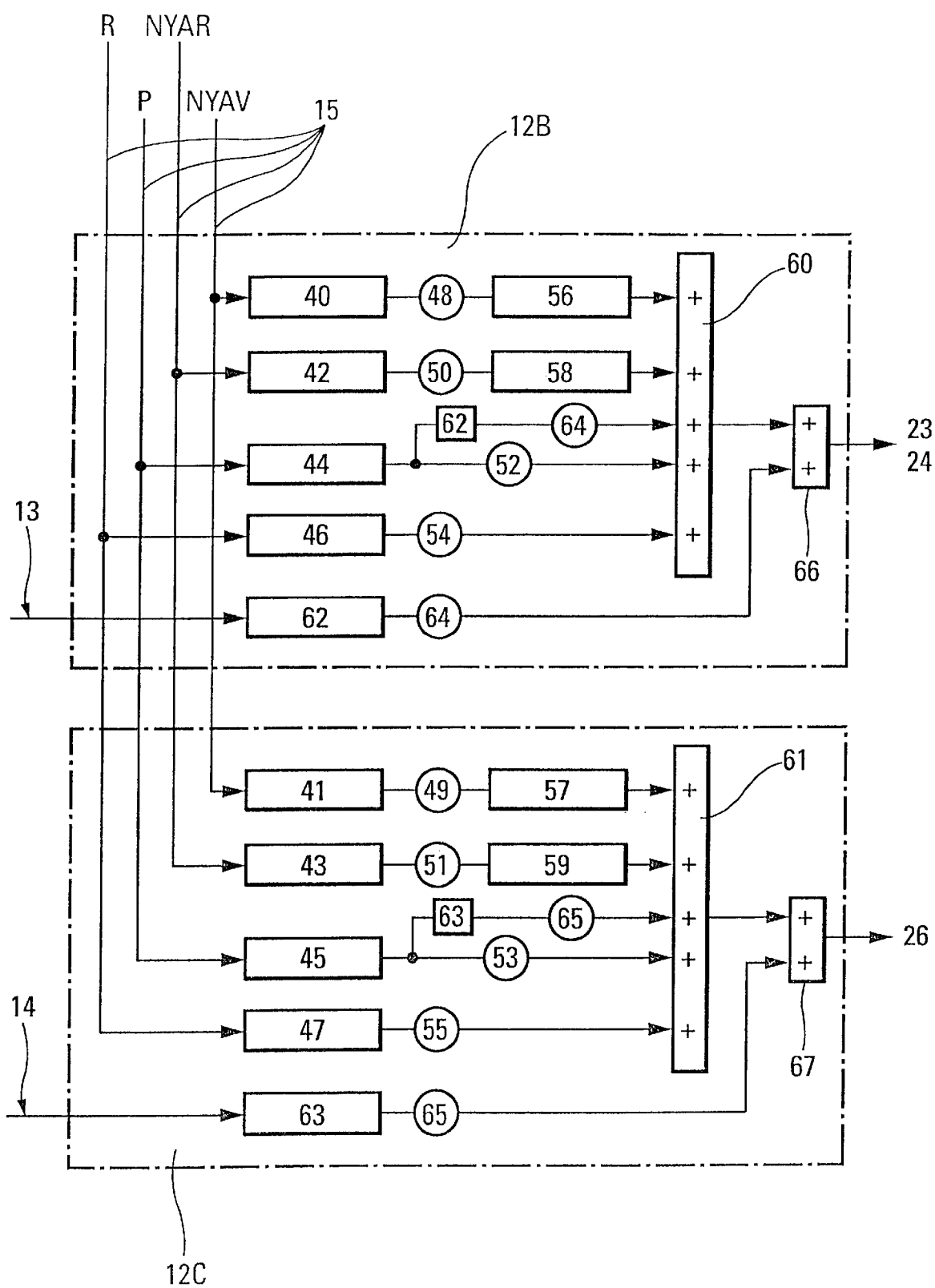
FIG. 4 is the block diagram of the roll and yaw control systems of the airplane of FIG. 2.

FIG. 4 schematically depicts the parts 12B and 12C of the flight control computer 12 correspondingly respectively to roll control by means of the ailerons 23 and the spoilers 24 and to yaw control by means of the rudder 26. These two parts 12B and 12C of the computer 12 receive, via the corresponding links 15, the lateral acceleration measurements NYAV and NYAR delivered by the accelerometers 5 and 6, together with the roll rate P and yaw rate R which are measured by the gyrometer 7.

In each of said parts of the computer 12B and 12C, each measurement NYAV, NYAR, P and R is filtered by high-frequency filtering means (frequency in excess of 10 Hz) 40, 41; 42, 43; 44, 45; 46, 47, respectively, allowing the corresponding commands to get around problems of noise and spectrum folding without disadvantageous influence on the performance of said commands. In addition, said measurements are weighted using gains, by virtue of respective gain multipliers 48, 49; 50, 51; 52, 53; 54, 55. Respective phase controllers 56, 57 and 58, 59 (analogous to the controllers 34 and 35 of the part 12A of the computer 12) receive the weighted accelerometer measurements NYAV and NYAR so as to check actively the structural modes of the fuselage 2. The signals leaving the controllers 56 and 58 and the gain multipliers 52 and 54 are sent to summers 60. Likewise, the signals leaving the controllers 57 and 59 and the gain multipliers 53 and 55 are sent to a summer 61.

In addition, in each part of the computer 12B or 12C, the filtered roll rate P appearing at the outputs of the filtering means 44 or 45 respectively is integrated by an integrator 62 or 63 then weighted by a gain multiplier 64 or 65. Such integration actions make it possible to create information about the roll angle, which information is sent to the respective summer 60 or 61.

Thus, at the outputs from the summers 60 and 61 there are obtained, respectively, a roll command and a yaw command each of which is a function of the four measurements NYAV, NYAR, P and R and of the roll angle information resulting from integration by the integrator 62 or 63 respectively.

The flight computer part 12B additionally comprises a processing part 62 and a gain multiplier 64 for the roll flight control datum generated by a flight control 8, 9 and sent to said device 62 by a link 13. This roll flight control datum thus processed and weighted by the device 62 and the gain multiplier 64 is sent to a summer 66 in which it is summed with the roll command appearing at the output of the summer 60. The composite roll command appearing at the output of the summer 66 is sent to the actuators 16.i of the ailerons 23 and of the spoilers 24.

Likewise, the part of the computer 12C additionally comprises a processing device 63 and a gain multiplier 65 for the yaw flight control datum generated by a flight control 10, 11 and sent to said device 63 by a link 14. This yaw flight control datum thus processed and weighted by the device 63 and the gain multiplier 65 is sent to a summer 67 in which it is summed with the yaw command appearing at the output of the summer 61. The composite yaw command appearing at the output of the summer 67 is sent to the actuators 16.i of the rudder 26.

What is claimed is:

1. An aircraft with electric flight controls, provided with control surfaces able to be moved by electrically operated actuators, said aircraft comprising:

controls and at least one flight control computer, said controls being actuated by a pilot and generating electric flight control datums which are sent to said flight control computer, the latter computer generating, on the basis of said electric flight control datums and flight control parameters, commands in roll, pitch and yaw, which are sent to said actuators to move said corresponding control surfaces;

an inertial reference system comprising elements useful in navigation and elements useful in flight control, the latter elements being either of the gyrometer type or the accelerometer type; and a fuselage able to deform and vibrate with the formation of vibration nodes and antinodes distributed along the longitudinal axis of said aircraft, wherein:

said inertial reference system has an exploded structure with said elements useful in flight control separated from said elements useful in navigation;

said elements useful in flight control are distributed along said fuselage;

each element useful in flight control, of the gyrometer type, is arranged at a vibration node of said fuselage;

each element useful in flight control, of the accelerometer type, is arranged at a vibration antinode of said fuselage; and said elements useful in flight control are connected to said flight control computer so that the measurement signals they deliver are used as flight control parameters.

2. The aircraft as claimed in claim 1, the fuselage of which deforms and vibrates in such a way as to have a vibration antinode at each of its ends, and a vibration node near its center of gravity, and which comprises:
- at least one front accelerometer arranged at the front part of said fuselage and delivering a vertical acceleration measurement and a lateral acceleration measurement;
- at least one rear accelerometer arranged at the rear part of said fuselage and delivering a vertical acceleration measurement and a lateral acceleration measurement; and
- at least one gyrometer arranged near said center of gravity of said aircraft and delivering roll rate, pitch rate and yaw rate measurements.

3. The aircraft as claimed in claim 2, wherein said vertical acceleration measurements generated by said front accelerometer and by said rear accelerometer respectively and the pitch rate measurement generated by said gyrometer, are used as flight control parameters to formulate said pitch commands.

4. The aircraft as claimed in claim 2, wherein said lateral acceleration measurements generated by said front accelerometer and by said rear accelerometer respectively, and said roll rate and yaw rate measurements generated by said gyrometer, are used as flight control parameters to formulate said roll commands.

5. The aircraft as claimed in claim 2, wherein said lateral acceleration measurements generated by said front accelerometer and by said rear accelerometer respectively, and said roll rate and yaw rate measurements generated by the gyrometer, are used as flight control parameters for formulating said yaw commands.

6. The aircraft as claimed in claim 3, and which comprises:
- means of filtering said acceleration measurements and the rate measurement or measurements to eliminate measurement noise therefrom and avoid spectrum folding;
- gain multipliers for weighting each of said filtered acceleration or rate measurements;
- phase control means for said filtered and weighted acceleration measurements; and
- summing means for summing said filtered, weighted and phase-controlled acceleration measurements, said filtered and weighted rate measurement or measurements and the corresponding electric flight control datum to formulate the corresponding command.

7. The aircraft as claimed in claim 6 and which additionally comprises means of integrating the roll rate so as to create information about the roll angle, which information is sent to said summing means after it has been weighted by a gain multiplier.

* * * * *